March 18, 1958 L. A. M. PHELAN 2,827,379
PROCESS OF COOKING FOOD
Filed July 11, 1955 2 Sheets-Sheet 1
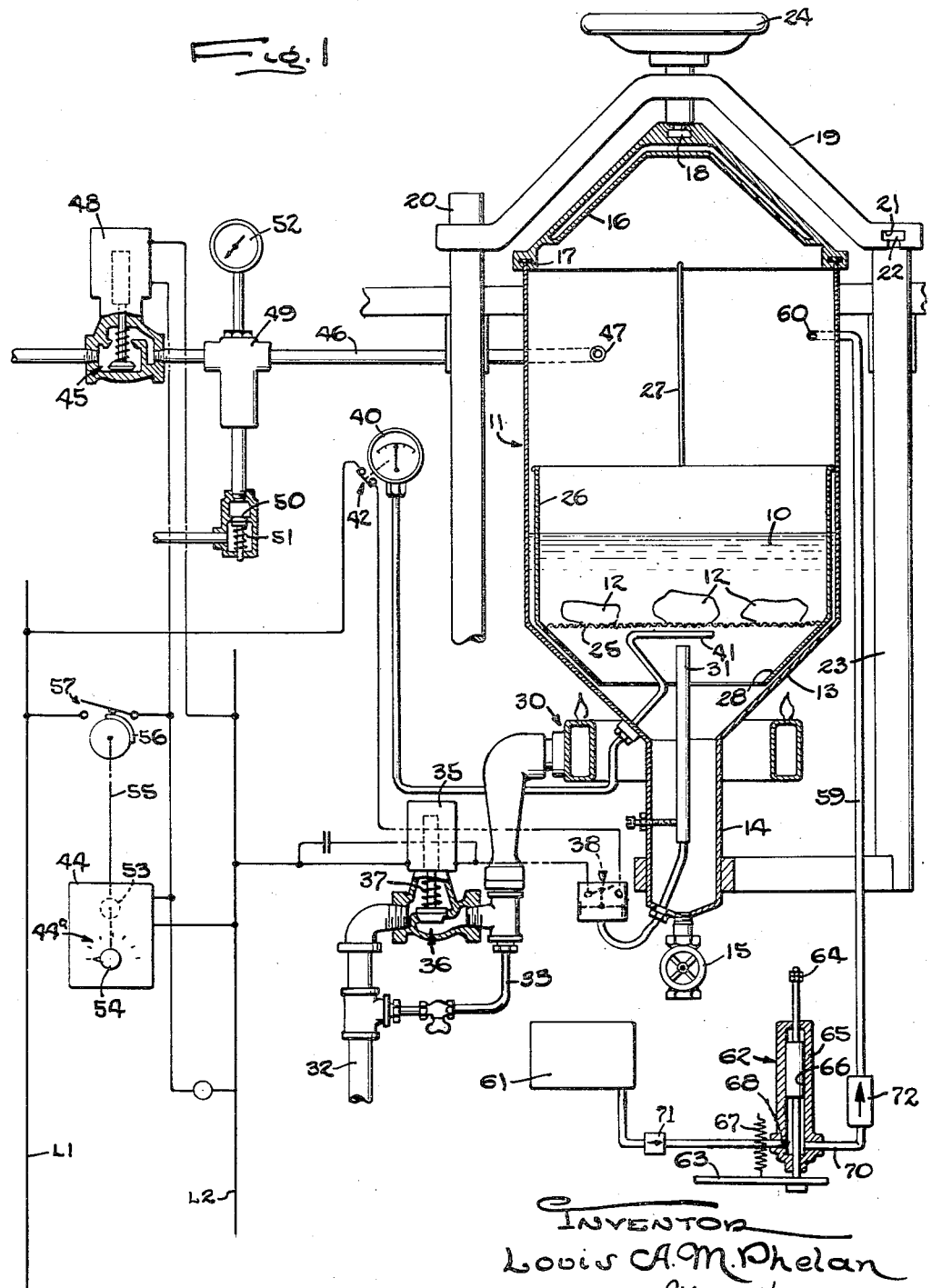

March 18, 1958  L. A. M. PHELAN  2,827,379
PROCESS OF COOKING FOOD
Filed July 11, 1955  2 Sheets-Sheet 2
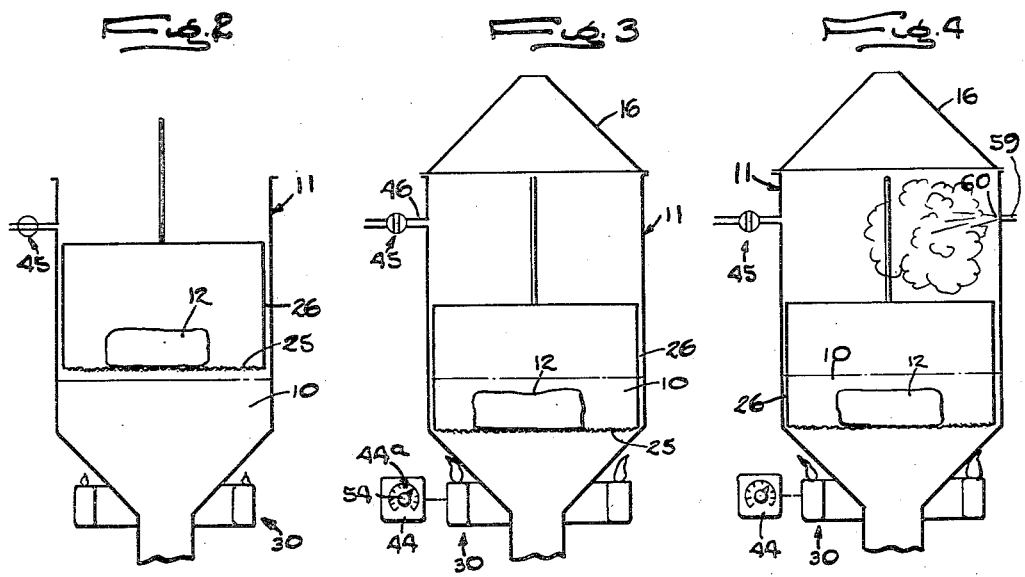
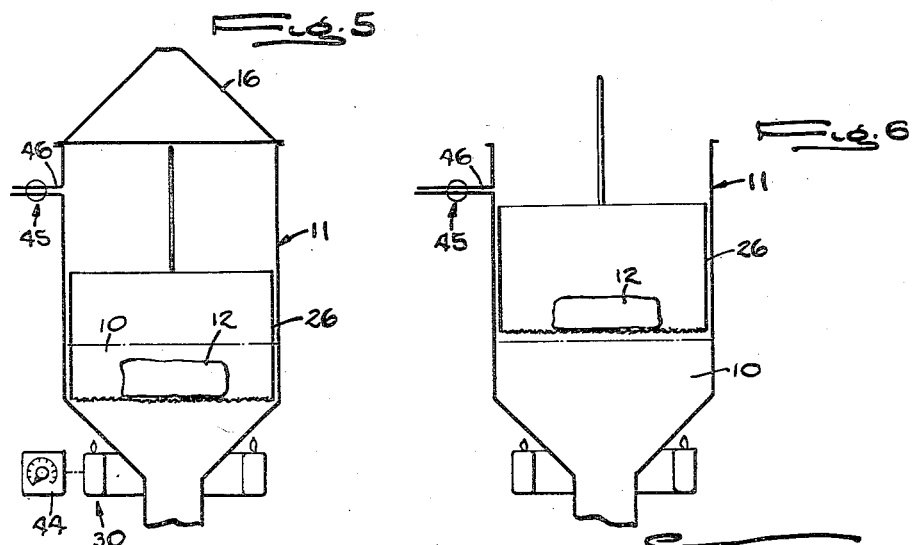
INVENTOR
Louis A. M. Phelan
By Carlson, Pitzner, Hubbard & Wolfe
ATTORNEY

United States Patent Office 2,827,379
Patented Mar. 18, 1958

2,827,379

PROCESS OF COOKING FOOD

Louis A. M. Phelan, Rockton, Ill.

Application July 11, 1955, Serial No. 521,021

3 Claims. (Cl. 99—107)

This invention relates to the cooking of foods by immersing the same in a nonaqueous high boiling point liquid heated to a cooking temperature.

The general object is to provide a new and improved process of the above character for thoroughly cooking foods more rapidly (for example, one minute for ground beef and six minutes for raw chicken) than has been possible heretofore, while at the same time converting the food to a tender and delicious condition having an appetizing appearance without dehydration and with a minimum shrinkage.

It is also a general object to provide a novel process for cooking fish, shrimp, chicken, ground beef, etc. in the same body of nonaqueous liquid without danger of transferring odorous compounds from one food to another.

Another object is to immerse the food in a body of nonvolatile liquid such as oil maintained under temperature and pressure conditions such as to accelerate the attainment all the way through the food of higher cooking temperatures and at a rate substantially greater than has been possible heretofore.

A further object is to utilize a heated body of high boiling point liquid not only to effect a quick searing and browning of the food surface to contain the natural juices but also as an aid in quickly developing the desired high cooking pressure.

A more detailed object is to derive the high cooking pressure by the sudden vaporization of water by the heat stored in the cooking liquid.

Other objects and advantages of the invention will become apparent from the following detailed description taken in connection with the accompanying drawings, in which:

Figure 1 is a vertical sectional view of an apparatus for practicing the improved process together with the associated controls shown schematically.

Figs. 2 to 6 are diagrammatic views illustrating successive steps in the cooking of food.

Generally stated, the improved process includes the steps of heating a body 10 of high boiling point nontoxic nonaqueous liquid in a receptacle 11 to a temperature well above the boiling point of water (for example 370 degrees F.), immersing pieces 12 of the food to be cooked in the heated liquid, closing the receptacle, increasing the pressure in the receptacle to a value substantially above atmospheric pressure (for example, between 35 and 65 p. s. i.) sufficient to cook the food thoroughly in a comparatively short interval, releasing said pressure at the end of such interval, and withdrawing the cooked food from the heated liquid.

In the form shown for purposes of illustration, the cooking vessel 11 comprises a cylindrical vessel or kettle having a frusto-conical bottom 13 terminating in a pocket 14 into which small food particles may settle and be drawn off through a valve 15. The vessel is adapted to be closed tightly by a cover 16 carrying a gasket 17 which, when pressed down against the upper edge of the vessel, provides a seal capable of withstanding a relatively high pressure. Herein, the cover is suspended from the lower end of a screw 18 threaded through a bracket 19 pivoted at one end on a rod 20 to swing horizontally into and out of alinement with the vessel. A T-slot 21 in the outer end of the bracket is, when the cover is swung into alinement with the tank when the screw is loosened, adapted to interlock with a complementally shaped head 22, on the upper end of a fixed rod 23. Then, by turning the handle 24 of the screw, the cover 16 may be lowered against the vessel end forcing the gasket against the latter with the required clamping pressure.

While being cooked, the pieces of food rest on the perforated bottom 25 of a basket 26 having an upstanding handle 27. Herein, the side wall of the basket is extended below the bottom 25 as indicated at 28 and shaped to fit against the conical bottom of the cooking vessel.

The cooking medium 10 may be any liquid which has a boiling point well above 300° F. and which will not adversely affect the flavor of the cooked food. Mineral oils, silicone liquids, and ordinary cooking fats such as hydrogenated oils are examples of liquids that may be used and will not volatilize at the high temperatures, such as 370 degrees F. which is utilized to advantage in effecting rapid cooking of meats by the present process. The volume of molten fat employed is such as to completely cover the pieces of food to be cooked when the basket 26 is lowered to cooking position as shown in the drawing.

The cooking liquid is maintained at the desired temperature by a heater 30 preferably controlled automatically as by a thermostat having a sensing element or bulb 31 projecting into the vessel to a position immediately below the basket bottom 25 and therefore close to the food during cooking. Herein, the heater is a gas burner encircling the bottom 13 of the vessel with flames impinging against the latter at angularly spaced points. A continuous flow of gas from a supply pipe 32 is admitted to the burner through a by-pass conduit 33 thus maintaining a heat delivery somewhat below that required to maintain the desired temperature of the liquid. Regulation of the heater to maintain the desired constant temperature is accomplished by opening and closing of a valve 36 in the main gas supply line to the burner. This valve is normally closed by a spring 37 and opened by energization of a solenoid 35 normally in response to closure of a switch 38 of the thermostat 31, the switch being opened when the temperature of the liquid rises above the desired value determined by the usual adjustment of the thermostat.

The prevailing temperature of the cooking liquid 10 is indicated on the scale of a thermometer 40 having a bulb 41 disposed in the liquid just below the food being cooked. Herein, the thermometer incorporates a switch 42 which is normally closed but opened whenever the temperature of the liquid 10, because of a failure of the primary control, rises above a safe maximum value somewhat above the selected operating temperature controlled by the thermostat 31. The switch 42 is included in the circuit for the solenoid 35 which, under the normal control of the thermostat 31, opens and closes the valve 36 to increase and decrease the flame and therefore the temperature of the liquid 10 to maintain the same at a substantially constant average value determined by the selected setting of the thermostat 31. If the safe maximum temperature is exceeded as evidenced by opening of the switch 42, the solenoid is disabled and the valve 36 held closed.

The duration of the cooking period is determined by a timer 44 controlling a valve 45 in an outlet pipe 46 which communicates with the cooking vessel at a point 47 well above the level of the heated liquid 10 therein so as to avoid loss of the liquid when the pressure is relieved suddenly at the end of the cooking cycle. Herein the valve is biased to open and is closed by energization of the coil of a solenoid 48. Interposed in the pipe 46 is a casing 49 communicating with a valve 50 loaded by a spring 51 and adapted to open automatically in the event the pressure in the cooking vessel exceeds a safe value. A gauge 52 communicating with the casing 49 indicates the prevailing pressure in the vessel 11.

The timer 44, which is of well known construction, embodies an electric motor 53 which is started in response to turning of a knob 54 clockwise away from the zero position shown in Fig. 1. In the same manual turning of the knob, the driven shaft 55 of the motor unit is turned correspondingly and in the initial movement, a cam 56 allows a switch 57 to close. This completes a circuit for energizing the solenoid 48 to close the valve 45 and therefore the exhaust pipe 46. The shaft 55 is turned slowly and counterclockwise until, when the knob reaches zero position, the motor is deenergized and the switch opened. This deenergizes the solenoid and allows the valve 45 to open so as to quickly reduce the pressure in the cooking vessel.

As pointed out above, an important step in the improved process is the substantial increase in the pressure within the cooking vessel immediately after immersion of the food in the heated fat. While such a pressure change may be effected in various ways as by injecting steam or other gas at the desired pressure into the vessel after closing of the cover thereon, it is preferred to utilize the heat stored in the liquid 10 to vaporize other liquid such as water within the vessel after closure thereof.

Water, when used as the pressure producing agent, may be derived from an internal source but preferably is supplied from an external source through a pipe 59 which opens into the vessel at 60 above the level of the liquid 10. A supply of the vaporizable liquid is contained in a storage tank 61 and withdrawn in measured amounts by a pump 62 adapted to be actuated by manually depressing a foot pedal 63 through a distance determined by adjustment of a stop 64. Herein, the pump comprises a piston 65 reciprocable in a cylinder 66 and urged upwardly by a spring 67 to the position shown in Fig. 1. Water from the tank 61 gravitates into the cylinder through a pipe 68 having a check valve 71 interposed therein. As the pedal 63 is depressed and the piston moves down, the valve 71 closes and the water trapped in the cylinder is forced out through a pipe 70 and a check valve 72 and is delivered through the pipe 59 into the cooking vessel. When the pedal is released, the check valve 71 opens allowing the cylinder to be refilled by upward movement of the piston under the action of the spring 67.

The charge of water forced into the vessel 11 comes into contact with the high temperature liquid 10 and is vaporized immediately producing steam pressure of a magnitude proportional to the volume of the water delivered into the vessel. In the present instance, each charge is 40 to 50 cc. but this may be varied as desired by adjusting the nut 64 on the plunger stem to thereby change the limit of advance of the plunger as the pedal is depressed.

Considering now the use of the above described apparatus in cooking meats in accordance with the improved process, let it be assumed that a quantity of fat sufficient to immerse the meat has been heated in the vessel 11 to the proper temperature, for example, 370 degrees F. This temperature is maintained automatically by the action of the thermostat 31 irrespective of the frequency of use of the apparatus in cooking successive batches of food. Also, assume that meat has been seasoned and preferably coated on the surface with crumbs or other material to facilitate browning.

With the basket 26 temporarily held above the level of the molten fat as shown in Fig 2, the pieces 12 of meat are placed on the bottom of the basket which is then lowered into the fat. Immediately thereafter the cover 16 is swung into active position and tightened down by turning the hand wheel 24 thereby sealing the top of the vessel. As soon as possible thereafter, the knob 54 is turned clockwise to the position, indicated on the scale 44a, corresponding to the cooking interval to be employed. In the case of raw chicken such as the leg, thigh or breast, the interval usually selected is about six minutes.

Closure of the switch 57 in the initial turning of the timer knob energizes the solenoid 48 to close the valve 45. With the vessel now completely closed (Fig. 3), the medium for increasing the internal pressure is injected as soon as possible. Where, as here, water is used to create the pressure, the properly measured charge is delivered into the vessel (Fig. 4) simply by depressing the foot pedal 63 to the limit of its travel. Upon contacting the hot fat, the water, usually about 40 cc., is converted into steam to develop a pressure of over 35 p. s. i. and preferably about 65 p. s. i.

The cooking continues at a rapid rate until the selected interval has expired as evidenced by return of the timer knob to the zero position which is accompanied by opening of the switch 57 and therefore the exhaust valve 45. The pressure within the vessel is thus reduced quickly (Fig. 5). Immediately thereafter, the cover 16 is released and removed and the basket raised to a draining position above the fat (Fig. 6) thus terminating the cooking.

The chicken emerges from the fat with a properly browned appealing color. It is thoroughly cooked all the way through and substantially all of the natural juices are retained within the meat. In flavor and tenderness, the product equals or exceeds that of chicken carefully prepared and cooked by any prior method.

The procedure described above provides for the cooking and browning of food in a one step process made possible by the coordinated application of heat and pressure while the food, especially meat, is submerged in a hot edible liquid. The resulting product is thoroughly and tastily cooked and uniformly and attractively browned in a minimum time, with minimum labor and skill, and without loss of natural juices.

The uniform and attractive browning is achieved by complete submergence of the food in the high temperature fat for a definite time interval substantially equal to the time required for full cooking of the food to a tender condition. The desired brown color is best attained by employing a temperature on the order of 370 deg. F.

The tasty flavor of the cooked meat results from maximum retention of the natural juices throughout the meat and the prevention of substantial absorption of the fat on the surface of the meat. These desirable actions are attributable to the substantial pressure employed during the cooking and the consequent increase in the boiling point of the natural moisture to a temperature well above the temperature actually attained within the food.

Pressurizing the meat during cooking also prevents the absorption of the cooking fat because the moisture in the meat is not boiled out for the reason mentioned above.

The coordinated relatively high temperatures and pressures and their application simultaneously also contribute in several ways to the cooking of the food in the shortest possible time. First, the heat for the cooking is transferred rapidly to the food due to the high temperature of the fat thus creating a high temperature difference. A temperature of this magnitude, if used in ordinary deep fat frying, would result in severe dehydration and overcooking of the outer surface of the meat.

Secondly, the presence of moisture increases the thermal conductivity of food. Therefore, the retention of the natural moisture in the manner described above is another factor contributing to the shortening of the cooking time.

Thirdly, the total heat required to be transmitted from the fat and conducted through the food to the center thereof is reduced to a minimum. This is because little heat is wasted in vaporizing the moisture within the food, all of the available heat being utilized by efficient conduction in raising the subsurface or cooking temperature.

Fourthly, by utilizing relatively high pressure to raise the boiling point of the natural moisture in the food, the high fat temperature may be employed to achieve the desired cooking temperature at the center of the food in the shortest possible time and without dehydration or overcooking the outer portions of the food. At the same time, the fat temperature and steam pressure may be coordinated to equalize the time for complete cooking with that required for the desired browning.

Finally the single step process lends itself to automation more readily than the two step browning and cooking processes heretofore used. Loading and unloading of the food basket, closing and opening the cooker, and setting the timer 44 requires little skill. In cooking different foods, the only change is the interval measured by the timer. All other conditions of temperature, pressure, depth of the fat and delivery of the water charge by the foot pedal 63 are the same. It is unnecessary to test the food to determine the completeness of either the cooking or the browning. As a result, a high degree of uniformity is achieved with minimum skill on the part of the operator.

The combination of operating conditions above described are further advantageous in enabling various kinds of odorous foods such as fish, shrimp, onions, etc. to be cooked without contaminating the cooking oil and adversely affecting batches of chicken or other foods subsequently cooked. That is to say, the fat may be used over and over again in cooking successive batches of various kinds of foods without carrying over the flavor or odor of one food to the next. This is believed to be due to the steam distillation which takes place as a result of the pressure build up and subsequent release through the vessel outlet as above described. That is to say, any odor producing compound transferred to the hot oil is distilled off and is carried out with the steam as the latter is vented from the vessel at the end of each cooking cycle.

As pointed out above, an important characteristic of the improved process is the substantial shortening of the food preparation time while achieving an even more flavorful product. Whereas a minimum of 20 to 25 minutes is ordinarily required for cooking raw chicken, thorough cooking occurs with the improved process in 3 to 6 minutes. Fish fillets, which normally require 20 to 30 minutes may be cooked in 3 minutes.

In cooking different kinds of foods, the only change required is the interval measured by the timer 44. All other conditions of temperature, pressure, depth of the cooking liquid, and the manipulations of the cover 16 and the foot pedal 63 are the same. As a result, a high degree of uniformity is achieved in the cooked product since no skill on the part of the operator is required once the cooking times for the different foods have been established.

The cooking times given above contemplate the maintenance throughout the cooking interval of a temperature of about 370 degrees F. and the attainment of a pressure of approximately 65 p. s. i. Lower temperatures and pressures may of course be employed with a consequent increase in the cooking time.

I claim as my invention:

1. The process of browning and cooking meat which comprises heating in a sealable receptacle a body of a cooking medium to a predetermined temperature value well above 300° F., said cooking medium being a non-aqueous edible liquid which will not volatilize at high temperatures, submerging pieces of the meat in said heated liquid, immediately closing and sealing said receptacle to provide a pressure tight chamber, converting moisture within said receptacle into steam to produce in said chamber above the submerged meat a super-atmospheric steam pressure of a predetermined value, said temperature and pressure values being correlated with each other and being of sufficient magnitude to effect thorough browning and cooking of the meat in less than an interval of about six minutes without volatilization of the cooking liquid, opening said chamber to release said pressure after said interval for cooking the meat, and finally removing the cooked food before substantial absorption of said liquid thereby.

2. The process as defined in claim 1 in which said super-atmospheric steam pressure is produced by injecting a charge of water into said receptacle after submersion of the meat and closing of the receptacle.

3. The process as defined in claim 1 in which said temperature value is approximately 370° F., and said super-atmospheric steam pressure value is within a range from approximately 35 p. s. i. to approximately 65 p. s. i.

References Cited in the file of this patent

UNITED STATES PATENTS

| | | |
|---|---|---|
| 2,218,188 | Wittenberg | Oct. 15, 1940 |
| 2,532,639 | Payne | Dec. 5, 1950 |
| 2,537,695 | Page | Jan. 9, 1951 |
| 2,546,464 | Martin | Mar. 27, 1951 |
| 2,778,736 | Wagner | Jan. 22, 1957 |

OTHER REFERENCES

"Pressure Cookery," 1947, by L. R. Carroll, published by M. Barrows and Company, Inc., New York, pages 47, 50 and 52.